March 1, 1960 W. W. CHAMBERS 2,926,854
THERMOSTATICALLY CONTROLLED VALVES
Filed Nov. 17, 1958 2 Sheets-Sheet 1

March 1, 1960 W. W. CHAMBERS 2,926,854
THERMOSTATICALLY CONTROLLED VALVES
Filed Nov. 17, 1958 2 Sheets-Sheet 2

United States Patent Office 2,926,854
Patented Mar. 1, 1960

2,926,854

THERMOSTATICALLY CONTROLLED VALVES

William W. Chambers, Anaheim, Calif., assignor to Robertshaw-Fulton Controls Company, Richmond, Va., a corporation of Delaware Application November 17, 1958, Serial No. 774,277

7 Claims. (Cl. 236—102)

This invention relates to thermally responsive devices and more particularly to thermostatic control valves.

A common application of a thermostatically controlled valve is in a pneumatic or hydraulic systems wherein the temperature of a fluid flowing in the system is controlled by a device sensitive to the temperature of such fluid. While under some conditions, the present thermostatic control valves are acceptable, they are ineffective for aircraft use because such valves are sensitive to pressure changes prevalent at different altitudes, and they also present serious vibration and acceleration load problems.

An object of this invention is to provide a thermosensitive valve which is operable independently of ambient pressure conditions.

Another object of this invention is to reduce the vibration and acceleration load problems in a fluid flow system to a minimum.

A further object of this invention is to minimize resistance to fluid flow through the system of a fluid flow apparatus.

In a preferred embodiment of this invention, a pair of temperature sensitive tubular members are telescopically arranged with each free end attached to a different end of a temperature insensitive member and extending coaxially therewith to form a column-like structure which is resistant to large forces. A valve housing is connected to the other end of the outer tubular member and is secured to a conduit for rigidly mounting the telescopic assembly therein; the other end of the inner tubular member engages a valve member which is carried by the housing and which is operated by the tubular members as they elongate in response to a temperature increase. The structure is constructed and arranged to provide a balanced weight assembly to minimize vibration and acceleration load problems.

Other objects and advantages of this invention will become apparent from the following detailed description taken in connection with the accompanying drawings wherein.

Figure 1:
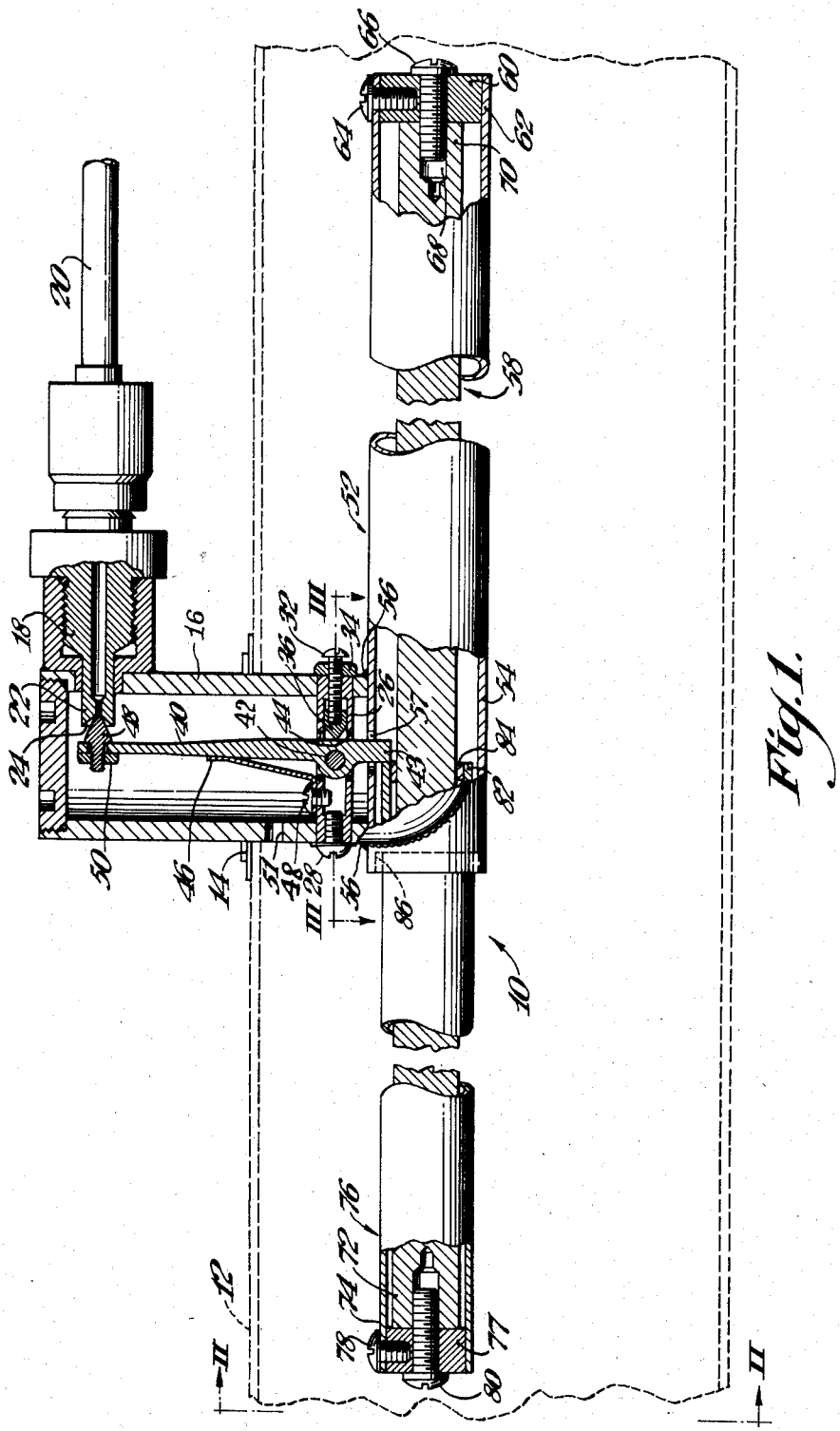
Fig. 1 is a partial longitudinal section of the device embodying this invention mounted on a conduit which appears in phantom lines.
Figure 2:
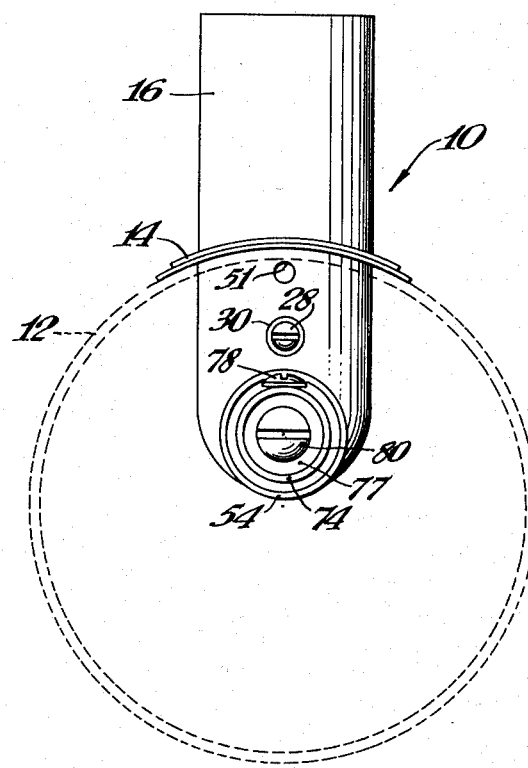
Fig. 2 is an end view of the device taken on line II—II of Fig. 1.

Referring now more particularly to the drawings, a thermostatic control device, indicated generally at 10, is fixedly mounted on a conduit 12 by suitable fluid-tight means 14 and extends partially within and partially without the conduit. The conduit 12 may be an element of a pneumatic or hydraulic system of an aircraft or similar structure and is adapted to conduit fluid from right to left as viewed in Fig. 1. The portion of the thermostatic control device which extends through the conduit 12 takes the form of a cylindrical valve housing 16. A nozzle 18 is attached to the upper portion of the housing 16 and communicates with a fluid-carrying duct 20. The nozzle 18 is formed with a reduced portion 22 which extends within the valve housing 16. The inner end of the reduced portion 22 is provided with a funnel-shaped configuration forming a valve seat 24.

Valve means is provided for cooperation with valve seat 24. To this end, a valve member support 26, of substantially cylindrical configuration with integrally formed plugged ends, extends diametrically across the lower portion of the housing 16. A screw 28 extends through a washer 30 which engages the housing 16 and is threadedly connected to one end of the valve member support. An adjustment screw 32 is threadedly connected to the other end of the valve member support 26 and a locknut 34 is provided on the adjustment screw 32 for engagement with the housing 16 to hold the valve member support 26 rigidly in place.

Figure 3:
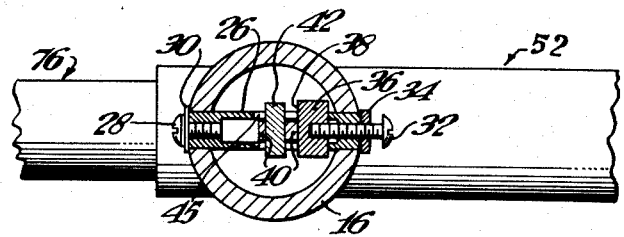
Fig. 3 is a sectional view taken on line III—III of Fig. 1.

A slidable member 36, having a wedge-shaped end 38, is movably positioned in the hollow interior of the valve member support 26. The adjustment screw 32 extends through the end wall of the valve member support 26 and is seated in a recess in the slidable member 36. An elongated valve member 40 is provided with a pivot pin 42 adjacent an end 43 thereof. The valve member 40 is loosely received in apertures 44 formed in the top and bottom of the valve member support as viewed in Fig. 1. The pivot pin 42 is slidably mounted in elongated slots 45 provided in the sides of valve member support 26 as shown in Fig. 3. A flat spring 46 is mounted on top of valve member support 26 by a screw 48 and engages the valve member 40 to cause slidable movement of pivot pin 42 in slots 45 until the valve member 40 engages the wedge-shaped end of slidable member 36. It is now apparent that adjustment screw 32 is operable to move the slidable member 36 for positioning the valve member 40 against the bias of the flat spring 46.

In addition, flat spring 46 serves as a valve return spring by urging pivotal movement of the valve member 40 to cause engagement of a poppet valve 48, which is secured to the terminal portion of valve member 40 by a nut 50, with the valve seat 24. An aperture 51 is provided on the portion of the housing 16 within the conduit 12 and faces downstream to bleed a fluid, such as air, from the housing 16 for a purpose which will become apparent hereinafter.

Means is provided for causing pivotal movement of the valve member 40 to unseat the poppet member 48 in response to a temperature increase of the fluid flowing in conduit 12. More particularly, a tubular member 52, of a material such as aluminum which is highly expansible in response to a temperature increase, has an end 54 rigidly secured by welds 56 to the lower portion of the housing 16. An elongated aperture 57 is provided in the end 54 of tubular member 52 and is adapted to loosely accommodate the end 43 of valve member 40. The tubular member 52 extends in an upstream direction and has a bar-like member 58 disposed therein. The bar-like member 58 is composed of a material substantially insensitive to temperature variations, such as Invar. A plug 60 is provided in the end 62 of tubular member 52. A screw 64 extends through the tubular member 52 and radially into the plug 60. Another screw 66 extends through the central portion of the plug 60 at right angles to the screw 64 and is threadedly received in a recess 68 formed in an end 70 of bar 58. Thus, a rigid connection is formed between end 70 of bar 58 and end 62 of tubular member 52.

The other end 72 of bar 58 is secured to an end 74 of another aluminum tubular member 76 by a plug 77 and screws 78, 80 in a manner similar to that just described for end 70. The tubular member 76 is smaller in diameter than the tubular member 52 and extends coaxially with the bar 58. The lengths of the tubular members 52 and 76 are substantially equal to provide a balanced-weight construction. Another end 82 of the tubular member 76 telescopes within end 54 of tubular member 52 and is adapted to engage end 43 of valve member 40 to cause pivotal movement of the same. Annular bushings 84 and 86 are provided between the end 82 of tubular member 76 and bar 58, and between end 54 of tubular member 52 and tubular member 76, respectively, to guide reciprocal movement of the end 82 of tubular member 76. The bushings 84 and 86 are made of a material, such as Teflon, and are adapted to prevent entry of fluid into the tubular member 52.

In operation, the control device is normally in the inoperative position, as shown in Fig. 1, with the poppet member 48 engaging seat 24. As the temperature of the fluid flowing in conduit 12 rises, tubular member 52 expands tending to move bar 58 and tubular member 76 to the right as viewed in Fig. 1. In addition, tubular member 76 expands simultaneously with tubular member 52. Hence, the combined expansion of tubular members 52 and 76 causes engagement of end 82 of the tubular member 76 with end 43 of valve member 40 to pivot the valve member in a counterclockwise direction.

Since fluid flow in conduit 12 is from right to left, as viewed in Fig. 1, fluid flows around housing 16 and creates a partial vacuum adjacent aperture 51 which tends to draw fluid from housing 16. As the valve member 40 is pivoted in a counterclockwise direction, poppet member 48 is retracted from seat 24 permitting fluid to be bled from duct 20 thereby releasing pressure on one side of a main valve (not shown) which is connected to duct 20 to cause operation of the main valve. This allows entrance of a cooling fluid into the conduit 12. The cooling fluid is fed into the conduit 12 until the temperature within the conduit becomes normal again causing contraction of tubular members 52, 76 to seat poppet members 48 and close the main valve. It is apparent that the system will modulate.

If adjustment of the temperature at which the system operates is desired, the adjustment screw 32 is merely screwed in or out to position the valve member 40 against the bias of flat spring 46. This moves the end 43 of the valve member 40 relative to the end 82 of tubular member 76 thereby varying the temperature at which the end 82 will engage the end 43 to pivot valve member 40.

Since the tubular members 52, 76 form a column-like structure and are substantially equal in length, a balanced-weight construction is provided which is resistive to large forces thereby minimizing vibration and acceleration load problems.

The obstruction to fluid flow in conduit 12 is minimized since a relatively small portion of the structure is perpendicular to the line of fluid flow and the open end 82 of tubular member 76 is positioned within tubular member 52.

While a single embodiment has been shown and described in connection with aircraft, it is apparent that there may be many changes in structure and operation as well as in application without departing from the scope of this invention as defined by the appended claims.

I claim:

1. A thermostatically operated valve comprising, in combination, a member substantially insensitive to temperature variations, a pair of temperature sensitive tubular members, each having an end thereof attached to a different end of said insensitive member and extending coaxially therewith, a valve housing having another end of one of said temperature sensitive members connected thereto, a valve seat in said housing, a valve member pivotally mounted in said housing, and resilient means in said housing for biasing said valve member into engagement with said valve seat, another end of the other of said tubular members being operatively engageable with said valve member, said pair of tubular members elongating in response to an increase in temperature to pivot said valve member out of engagement with said valve seat.

2. A thermostatically operated valve comprising, in combination, a member substantially insensitive to temperature variations, a pair of temperature sensitive tubular members, each having an end thereof attached to a different end of said insensitive member and extending coaxially therewith, a housing connected to another end of one of said temperature sensitive members, means forming an opening in said one temperature sensitive member, valve means carried by said housing and extending through said opening, another end of the other of said temperature sensitive members extending within said another end of said one temperature sensitive member and operatively engaging said valve means, said temperature sensitive members being movable in response to temperature variations to cause operation of said valve means.

3. In a thermostatic control device, the combination comprising a member substantially insensitive to temperature variations, a pair of temperature sensitive tubular members, each having an end thereof attached to a different end of said insensitive member and extending coaxially therewith, mounting means connected to another end of one of said temperature sensitive members, means forming an opening in said one temperature sensitive member, valve means carried by said mounting means and extending through said opening, another end of the other of said temperature sensitive members extending within said another end of said one temperature sensitive member and operatively engaging said valve means, said temperature sensitive members being movable in response to temperature variations to cause operation of said valve means, and said mounting means being positioned substantially equidistant from the ends of said temperature insensitive member to provide a balanced weight construction.

4. A thermostatic control apparatus comprising a housing having an open end, a first tubular member mounted adjacent an inner end thereof on said open end and extending laterally of said housing, a second tubular member having an inner end telescopically mounted in said inner end of said first tubular member and extending coaxially therefrom, said first tubular member having an aperture in the wall thereof opposite said inner end of said second tubular member, a rod member extending coaxially through said tubular members and being mounted on the opposite outer ends of said tubular members respectively, said rod being of material having a different coefficient of expansion than said tubular members, and control means in said housing including an element projecting through said aperture for operative engagement with said inner end of said second tubular member upon movement thereof in response to temperature variations to which said tubular members are exposed.

5. A thermostatic control apparatus comprising a housing having an open end, means adapted for connecting said housing to a fluid conduit with said open end exposed to fluid flow therein the temperature of which is to be controlled, a first tubular member mounted adjacent an inner end thereof on said open end and extending laterally of said housing, a second tubular member having an inner end telescopically mounted in said inner end of said first tubular member and extending coaxially therefrom, said first tubular member having an aperture in the wall thereof opposite said inner end of said second tubular member, a rod member extending coaxially through said tubular members and being mounted on the opposite outer ends of said tubular members respectively, said rod being of material having a different coefficient of expansion than said tubular members, means adapted to conduct cooling fluid through said housing to the conduit, and control means in said housing operable for controlling admission of cooling fluid thereto, said control means including an element projecting through said aperture for operative engagement with said inner end of said second tubular member upon movement thereof in response to temperature variations to which said tubular members are exposed.

6. A thermostatic control apparatus comprising a housing having an open end, means adapted for connecting said housing to a fluid conduit with said open end exposed to fluid flow therein the temperature of which is to be controlled, a first tubular member mounted adjacent an inner end thereof on said open end and extending laterally of said housing, a second tubular member having an inner end telescopically mounted in said inner end of said first tubular member and extending coaxially therefrom, said first tubular member having an aperture in the wall thereof opposite said inner end of said second tubular member, a rod member extending coaxially through said tubular members and being mounted on the opposite outer ends of said tubular members respectively, said rod being of material having a different coefficient of expansion than said tubular members, means including a valve seat adapted to conduct cooling fluid through said housing to the conduit, and control means in said housing including a valve member cooperable with said valve seat for controlling admission of cooling fluid, said valve member having an element projecting through said aperture for operative engagement with said inner end of said second tubular member upon movement thereof in response to temperature variations to which said tubular members are exposed.

7. A thermostatic control apparatus comprising a housing having an open end, means adapted for connecting said housing to a fluid conduit with said open end exposed to fluid flow therein the temperature of which is to be controlled, a first tubular member mounted adjacent an inner end thereof on said open end and extending laterally of said housing, a second tubular member having an inner end telescopically mounted in said inner end of said first tubular member and extending coaxially therefrom, said first tubular member having an aperture in the wall thereof opposite said inner end of said second tubular member, a rod member extending coaxially through said tubular members and being mounted on the opposite outer ends of said tubular members respectively, said rod being of material having a different coefficient of expansion than said tubular members, means including a valve seat adapted to conduct cooling fluid through said housing to the conduit, control means in said housing including a valve member cooperable with said valve seat for controlling admission of cooling fluid, said valve member having a pivoted element projecting through said aperture and being biased for operative engagement with said inner end of said second tubular member upon movement thereof in response to temperature variations to which said tubular members are exposed, and adjusting means carried by said housing and operatively engageable with said element for positioning the same relative to said inner end of said second tubular member.

References Cited in the file of this patent

UNITED STATES PATENTS

| | | |
|---|---|---|
| 477,253 | Hayes | June 21, 1892 |
| 2,021,727 | Hillen | Nov. 19, 1935 |